Oct. 31, 1961     V. A. MAGGIO     3,006,740
CONTACTING VESSEL WITH SOLIDS BED AND SCREENS
Filed March 3, 1958

INVENTOR:
VINCENT A. MAGGIO
BY: *Oswald H. Milmore*
HIS ATTORNEY

United States Patent Office 3,006,740
Patented Oct. 31, 1961

3,006,740
CONTACTING VESSEL WITH SOLIDS
BED AND SCREENS
Vincent A. Maggio, Houston, Tex., assignor to Shell Oil
Company, New York, N.Y., a corporation of Delaware
Filed Mar. 3, 1958, Ser. No. 718,796
6 Claims. (Cl. 23—288)

The invention relates to apparatus for effecting contact between a bed of granular solids and a fluid, wherein the fluid passes through both the bed and a screen adjoining the bed. Such apparatus may be used, for example, as a chemical reactor in a catalytic process, such as a catalytic desulfurization process wherein hydrocarbon vapors derived from heavy naphtha containing sulfur compounds is passed through a bed containing particulate cobalt-molybdenum catalyst to convert the sulfur compounds to hydrogen sulfide.

In such apparatus it is often necessary to mount a screen within the vessel near the bed of solids, either on the upstream side thereof to prevent entrained matter from being carried into the bed and/or on the downstream side to retain the solids. It has been found in practice that such screens become fouled in time, leading to reduced fluid flow rates which become so low that the unit must be shut down for cleaning, and attempts have been made to extend the on-stream life of the screens by forming them in shapes which provide for a total screen area greater than the cross sectional area of the vessel, as by giving the screen a conical shape. However, it was further found that clogging occurs also at the surface of the bed. For example, it is not feasible, without incurring an excessively high pressure drop, to use a sufficiently fine screen on the upstream side of the bed to remove all entrained matter, and this forms a layer at the bed surface which soon significantly interferes with the entry of the fluid into the bed; or the bed surface may become clogged by the deposition of matter from impurities carried in the fluid state with the fluid stream.

It is the object of the invention to provide an improved apparatus for contacting a fluid with a bed of subdivided solids wherein the on-stream time is extended. More particularly, it is the object to increase the surface area of the bed at which the fluid enters the bed (or leaves it) so that the clogging which occurs at the bed surface is spread out over a larger part of the bed.

In summary, according to the invention the vessel which contains the bed of solids is provided with a partition, preferably in the form of a screen, having a plurality of basket-shaped screens, e.g., cylindrical or conical in shape, joined to the partition at openings therein and the latter screens project into the bed so as to be in lateral contact therewith through an extended surface.

It was found that by this expedient the on-stream time of the apparatus could be prolonged significantly.

The invention will be described with reference to the accompanying drawing showing two preferred embodiments, wherein.

Figure 1:
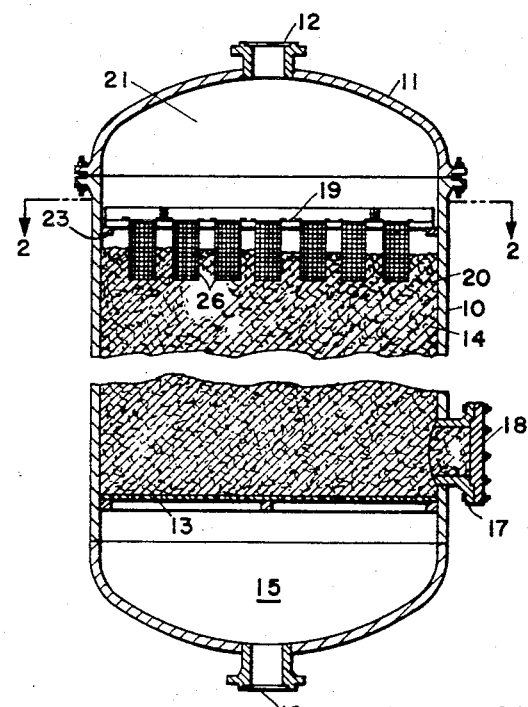
FIGURE 1 is a vertical sectional view through a vessel constructed in accordance with the invention.

Referring to FIGURES 1-4 of the drawing, the apparatus includes a tank 10 having a separate dome 11 fitted with a flanged nozzle 12 for connection to a supply pipe. A false bottom 13, including a framework and a perforated plate, supports a loose bed of granular material 14. The space 15 beneath the false bottom communicates with a discharge nozzle 16. The tank may include one or more manways, such as is shown at 17, closed by a plate 18.

The tank contains near the top a transverse partition 19 which divides the tank into a lower solids-chamber 20, containing the aforementioned bed of solids and an ante-chamber 21. The partition may include a framework of structural angle bars 22 which are supported by a ring 23, welded to the inside of the tank, and a metallic deck screen 24 which is secured to the framework by volts and washers 25 and formed of woven wires.

Figure 3:
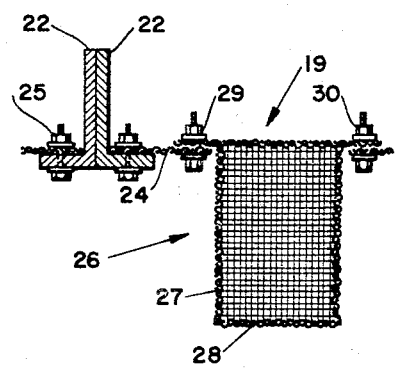
FIGURE 3 is a enlarged sectional view of one basket-shaped screen and a part of the deck-screen and framework, taken on the line 3—3 of FIGURE 2.
Figure 4:
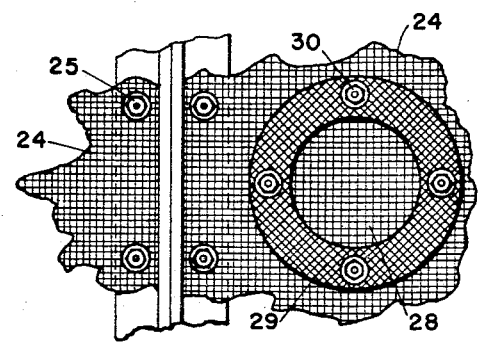
FIGURE 4 is a plan view of FIGURE 3.
Figure 2:
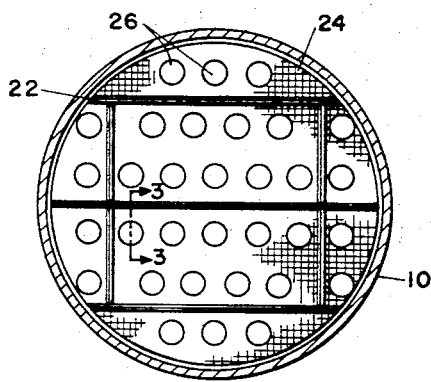
FIGURE 2 is a transverse sectional view, taken on the line 2—2 of FIGURE 1.

The partition contains a plurality of holes formed in the deck screen 24 to each of which is fastened a pendant, basket-shaped screen 26. As is shown in FIGURES 3 and 4, each screen 26 has a cylindrical side 27 carrying a flat bottom 28 and a rim 29, which may all be made of metallic, woven wire screen and joined by soldering or brazing. The baskets extend down through the openings in the deck screens with the rims 29 resting on the deck screen and secured thereto by any suitable means, e.g., by bolts and washers 30.

It will be noted from FIGURE 1 that the upper level of the bed 14 is spaced beneath the partition a short distance which is less than the heights of the pendant screens, and that the latter therefore extend into the bed, so that the solid particles are in contact not only with the bottom 28 but also with the side 27.

When used, for example, as a chemical catalytic reactor to convert sulfur compounds, such as thiophenes, to hydrogen sulfide the solids 14 are small catalyst particles consisting essentially of cobalt and molybdenum, such as pellets 3/16 in. in size. A hydrocarbon vapor, such as heavy naphtha containing the said sulfur compounds, is admitted through the nozzle 12 into the ante-chamber 21 and passes through the deck screen 24 and the several pendant screens 26 into the bed 14. The converted vaporous mixture of hydrocarbons and hydrogen sulfide is discharged through the nozzle 16. The screens intercept most of the scale and other foreign bodies which would otherwise foul the bed. By arranging the screens as shown much of the scale is able to collect at the bottoms of the pendant screen, leaving the sides unclogged. However, the action of the screens is imperfect and small solids are carried through the screens into the bed. By immersing the pendant screens in the bed these entrained solids are distributed over a greater boundary area of the bed, and the bed can be operated for an extended period without shutdown for cleaning.

By way of example, a reactor 6.5 feet in diameter applied to the service and with the catalyst described in the preceding paragraph had to be cleaned on an average of about every three months when provided with a deck screen of stainless steel, 8 x 8 mesh, but without the pendant screens. A similar reactor was constructed to provide thirty-nine pendant screens, as shown in FIGURES 1-4, each 16 inches deep and 5⅞ inches in diameter and made of like screen stock, and this latter reactor, when subjected to like operating conditions, had a prolonged on-stream time between cleanings of 18 months.

Figure 5:
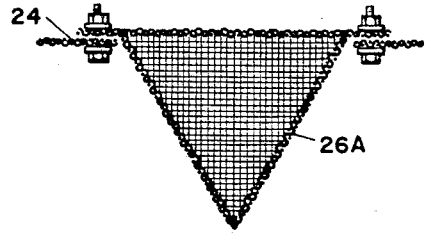
FIGURE 5 is a view corresponding to a portion of FIGURE 3 showing a modified shape of the basket-shaped screen.

FIGURE 5 shows a modification wherein the screens 26a are conical in shape.

I claim as my invention:
1. Apparatus for effecting contact between a fluid and granular solids which comprises: a tank; a bed of granular contacting solids within a portion of said tank constituting a solids chamber, an adjoining portion of said tank constituting an antechamber, said bed having an end surface directed toward and in flow communication with said antechamber throughout an area substantially equal to the full cross section of the bed for the distributed entry of fluid from the antechamber into the bed, said end surface being formed with a plurality of depressions which are distributed over said end surface so as to extend the total entry surface area of the bed, said depressions projecting into the bed for distances which are minor fractions of the depth of the bed but sufficiently deep to provide, collectively, an additional entry surface area greater than the cross sectional bed area; screening means situated within each of said depressions in lateral engagement with said granular material so as to maintain said depressions in being and thereby maintain the total entry surface area extended, said screening means providing a multiplicity of flow passages which are in communication with said antechamber and with substantially all of the said additional entry surface; inlet means for admitting fluid into said antechamber for flow therefrom into the bed over said end and additional entry surfaces; and outlet means for discharging said fluid from tank after traversing said bed.

2. Apparatus according to claim 1 wherein said screening means are basket-shaped mesh screens extending into said depressions, said screening means including further a partition which extends across the tank between said antechamber and said end surface of the bed and has an opening for each said basket-shaped screen, each of the latter being connected at the periphery thereof to the margin of the corresponding opening.

3. Apparatus according to claim 2 wherein said partition is a mesh screen for the additional passage of said fluid from the antechamber to the said end surface of the bed.

4. Apparatus for effecting contact between a fluid which is supplied with an entrained fouling material of small size and a bed of granular contacting solids the surface zone of which is subject to fouling by said entrained material when the said fluid enters the bed, said apparatus comprising: a tank; a bed of said granular contacting solids within a portion of said tank constituting a solids chamber, an adjoining portion of said tank above the bed constituting an antechamber, said bed having an upper entry surface of area substantially equal to the full cross section of the bed for distribution of entry of fluid from the antechamber into the bed, said upper surface being formed with a plurality of depression which are distributed over said surface so as to extend the entry surface area of the bed, said depressions projecting into the bed for distances which are minor fractions of the depth of the bed but sufficient to provide, collectively, an additional entry surface area greater than the cross sectional bed area; screening means situated in part within said depressions in lateral engagement with said granular solids and in part outside the bed and separating said bed from said antechamber, said part of the screening means within the depressions maintaining the depressions in being and thereby maintaining the total entry surface area extended, said screening means providing a multiplicity of flow passages of which some establish communication from said antechamber to substantially all of said additional entry surface and others establish communication from said antechamber to substantially all of said upper surface, said passages having sufficient size to permit the passage of some of said entrained fouling material therethrough; inlet means for admitting said fluid together with said entrained material into the antechamber for flow therefrom into the bed over said upper and additional surfaces; and outlet means for discharging said fluid from the tank after downward passage though said bed.

5. Apparatus according to claim 4 wherein said contacting solids are catalyst particles.

6. Apparatus according to claim 4 wherein said screening means includes a partition of wire-mesh screen extending across the tank in spaced relation above the bed and a plurality of basket-shaped wire-mesh screens which are situated in part within said depressions and are connected at their upper peripheries to openings in said partition screen, said basket-shaped screens having closed inner ends.

References Cited in the file of this patent
UNITED STATES PATENTS

| | | |
|---|---|---|
| 2,150,930 | Lassiat | Mar. 21, 1939 |
| 2,187,741 | Houdry | Jan. 23, 1940 |
| 2,380,391 | Bates | July 31, 1945 |
| 2,639,224 | McAfee | May 19, 1953 |
| 2,776,875 | Houdry | June 8, 1957 |
| 2,828,189 | Houdry | Mar. 25, 1958 |